US009230228B2

(12) United States Patent
Ryan et al.

(10) Patent No.: US 9,230,228 B2
(45) Date of Patent: Jan. 5, 2016

(54) METHOD AND SYSTEM FOR PROVIDING A BI-DIRECTIONAL FEEDBACK LOOP BETWEEN PROJECT MANAGEMENT AND PERSONAL CALENDAR SYSTEMS

(75) Inventors: Corinne M. Ryan, Westford, MA (US); Thomas Schaeck, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 2643 days.

(21) Appl. No.: 11/761,663

(22) Filed: Jun. 12, 2007

(65) Prior Publication Data

US 2008/0313004 A1 Dec. 18, 2008

(51) Int. Cl.
*G06Q 10/06* (2012.01)
*G06Q 10/10* (2012.01)

(52) U.S. Cl.
CPC ........ *G06Q 10/063116* (2013.01); *G06Q 10/06* (2013.01); *G06Q 10/063118* (2013.01); *G06Q 10/109* (2013.01); *G06Q 10/1093* (2013.01); *G06Q 10/1095* (2013.01)

(58) Field of Classification Search
None
See application file for complete search history.

(56) References Cited

U.S. PATENT DOCUMENTS

| 6,101,481 | A | 8/2000 | Miller | |
|---|---|---|---|---|
| 6,445,968 | B1 | 9/2002 | Jalla | |
| 7,058,660 | B2 | 6/2006 | Scott | |
| 7,386,465 | B1 * | 6/2008 | Friedland et al. | 705/9 |
| 7,774,221 | B2 * | 8/2010 | Miller et al. | 705/8 |
| 2002/0157043 | A1 * | 10/2002 | Hite et al. | 714/51 |
| 2003/0033191 | A1 * | 2/2003 | Davies et al. | 705/10 |
| 2003/0110067 | A1 * | 6/2003 | Miller et al. | 705/8 |
| 2004/0261013 | A1 * | 12/2004 | Wynn et al. | 715/511 |
| 2005/0165631 | A1 | 7/2005 | Horvitz | |
| 2006/0241997 | A1 | 10/2006 | Bhatawdekar et al. | |
| 2006/0277487 | A1 | 12/2006 | Poulsen et al. | |

OTHER PUBLICATIONS

Mustacoglu, "Internet Calendaring and Scheduling Core Object Specification (iCALENDAR) Compatible Collaborative Calendar-Server (CCS) Web Services," May 2006, International Symposium on Collaborative Technologies and Systems, pp. 12-17.*

* cited by examiner

*Primary Examiner* — Ivan R Goldberg
(74) *Attorney, Agent, or Firm* — BainwoodHuang

(57) ABSTRACT

A system providing a bi-directional feedback loop that assists project management to make timely decisions and alterations based on personal calendar data retrieved from team members' calendars. The system provides a project manager user with perceptible alerts in a project manager user interface in response to detecting a conflict between proposed or actual personal calendar events of a team member user and deliverables assigned to that team member user. The project manager user interface enables the project manager to take an action in the event such a conflict is detected. Project manager actions in this regard may include permitting a conflicting personal calendar event, forbidding the conflicting personal calendar event, delegating the conflicting deliverable to another team member, adjusting the deliverable requirements, and/or escalating the conflict to a higher level of management.

18 Claims, 6 Drawing Sheets

METHOD AND SYSTEM FOR PROVIDING A BI-DIRECTIONAL FEEDBACK LOOP BETWEEN PROJECT MANAGEMENT AND PERSONAL CALENDAR SYSTEMS

FIELD OF THE INVENTION

The present invention relates generally to computer applications for calendaring and project management, and more specifically to a method and system for providing a bi-directional feedback loop between project management and personal schedules.

BACKGROUND OF THE INVENTION

As it is generally known, popular computer application programs today include those referred to as "electronic calendars" that enable users to keep track of calendar events. These systems enable users to enter and view their daily schedules through a graphical user interface. User activities can be entered and subsequently viewed as calendar activities, such as meetings, vacations, phone calls, etc. Typical electronic calendars enable a user to set up to alerts that are generated at a certain time and/or at recurring times. Some existing calendaring systems can be used to provide alert messages to groups of users, and to allow users to view each other's calendars. Group scheduling functions are also sometimes provided, allowing a user to set up meetings with other users. Meeting invitation messages may also be provided, conveyed for example by way of electronic mail ("e-mail") messages, and responses to such invitations may be collected and processed.

Project management applications are another type of existing computer application program. Project management applications are used to monitor the resources, such as time and materials, needed for and/or allocated to a project. In existing project management applications, tasks to be completed during a project are entered into a database, the project management system determines dependencies between the tasks, and may further determine a critical path consisting of the series of tasks with the least amount of slack time.

Problems with existing systems relate to the lack of effective two-way integration between calendaring and project management applications. Specifically, existing systems lack an effective mechanism that associates time allocations in personal calendars with project requirements. Existing systems fail to effectively highlight issues caused by changes in personal electronic calendars of team members through a relevant project management user interface view. Existing systems also do not allow a project manager to conveniently take meaningful actions with regard to changes in the personal electronic calendars of team members, even when such changes have an impact on a project schedule. For example, existing systems do not provide a project manager with any mechanism allowing him to take actions such as approve, disapprove, auto-adjust schedule, etc., with regard to personal electronic calendars of team members in order to prevent non-project activities from having an impact on a project schedule. Existing systems accordingly also cannot convey any reason information regarding actions taken by a project manager with regard to team members' individual electronic calendars, for example to indicate why the project manager took a given action.

Some existing calendaring and scheduling applications, such as IBM's Lotus Notes® and Microsoft Outlook®, handle personal meetings and appointments so that they are easy for an individual user to manage. Existing project management (PM) tools, such as Microsoft Project®, handle tasks for many users to make managing a project plan easy everything runs on schedule. In addition, some software downloads from Microsoft allow exporting certain information from Microsoft Project to an Outlook calendar. While these downloads can be somewhat helpful, they are significantly limited in their effectiveness, and do not support using a team member's electronic calendar information to help flag problems and/or drive a project plan. Such existing systems further do not help a project manager conveniently adjust task assignments in a project plan as team members' schedules as become overloaded.

SUMMARY OF THE INVENTION

To address the above described and other shortcomings of previous approaches, a new method and system for providing a bi-directional feedback loop between project management and personal schedules are disclosed. The disclosed system accommodates the fact that during the normal life cycle of a project, team members will participate in collaborative aspects of the project, including meetings and e-mail conversations, and that other activities that further progress of the project. However, the disclosed system recognizes that potential schedule delays can be detected in circumstances indicating a conflict between a team member's personal calendar and a project schedule. For example, if too many non-project activities (e.g. meetings) are on a team member's personal schedule, this can be detected by the disclosed system, and an indication provided to their project leader that the team member appears to be too overloaded to complete one or more of their project deliverables (e.g. writing a design document) required as part of a project plan.

The disclosed system provides a bi-directional feedback loop that assists project management in making timely decisions and alterations based on accurate personal calendar data retrieved from individual team members' calendars. The disclosed system provides a project manager user with a perceptible alert in a project manager user interface in response to detecting an apparent conflict between proposed or actual personal calendar activities of a team member user and one or more project deliverables (i.e. tasks) assigned to that team member user. The project manager user interface further enables the project manager to take an action in the event such a conflict is detected. Project manager actions in this regard may, for example, include permitting a conflicting calendar activity, forbidding the conflicting calendar activity, delegating the conflicting task to another team member, adjusting the task requirements, and/or escalating the conflict to a higher level of management (e.g. through an e-mail message or the like). The results of such project manager actions are conveyed into the personal electronic calendar information of the impacted team member(s), and visual indications of such project manager actions may be provided through the personal electronic calendar user interfaces of such team member(s). Similarly, project manager actions may alternatively or additionally result in out-of-band messages (e.g. e-mail or other messages) being sent to the impacted team member(s), notifying the team members of the specific action(s) taken by the project manager.

The disclosed system conveniently allows a project manager to adjust tasks placed on team members' personal electronic calendars through an interactive process. Timely warnings to the project manager of team member overbooking allows for early schedule alterations instead of late-in-schedule surprises. The disclosed system enables project managers to receive early warnings of schedule slippage due to individual team members' personal schedules. Project managers can then select from and initiate multiple options including commenting on conflicting calendar activities, reassigning task responsibility, forbidding conflicting calendar activities, and others, enabling them to reduce individual participation in non-critical-path activities (e.g. meetings) in order to keep team members on the path of meeting project deadlines.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
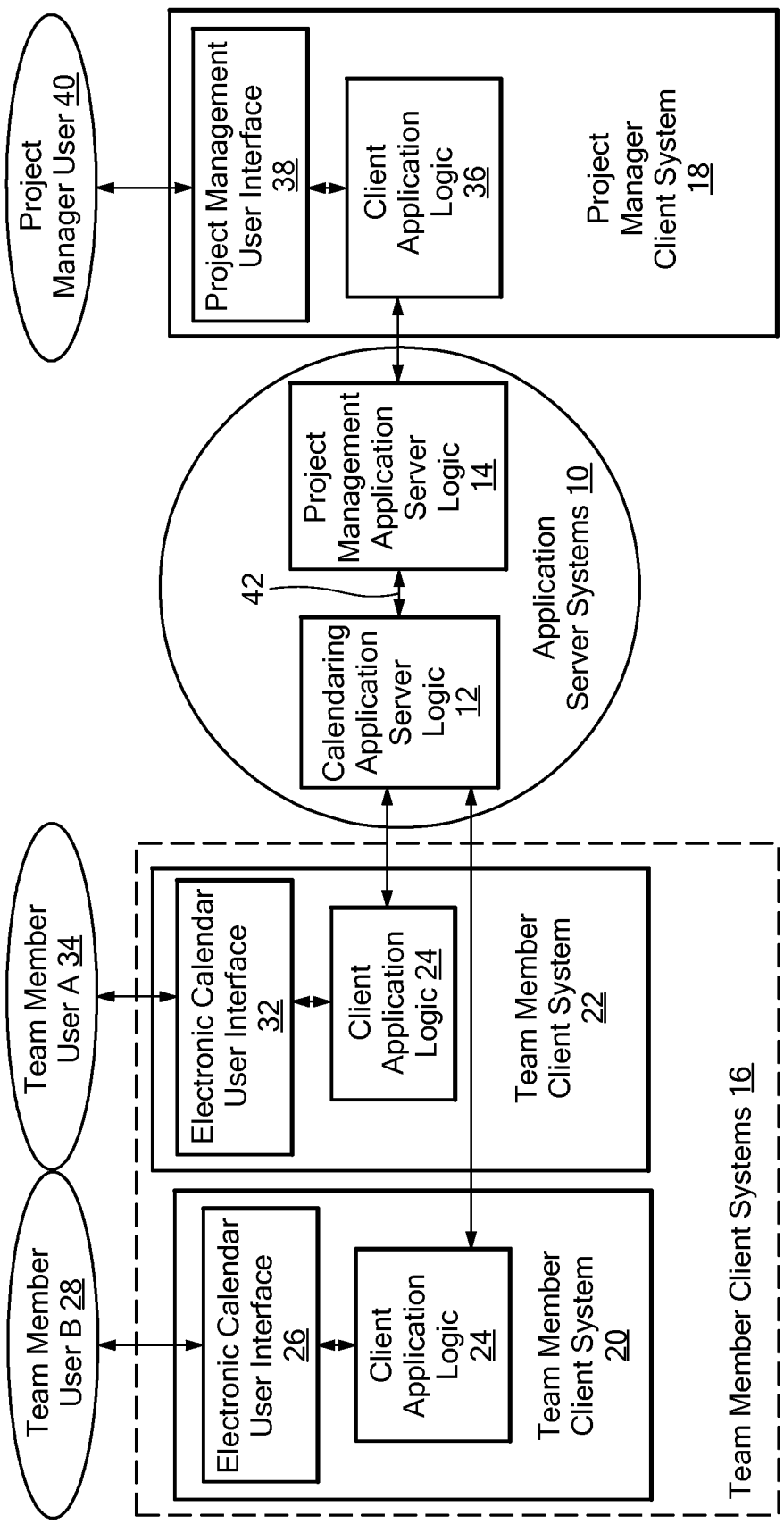
FIG. 1 is a block diagram of hardware and software components in an illustrative embodiment of the disclosed system.

FIG. 1 is a block diagram of hardware and software components in an illustrative embodiment of the disclosed system. As shown in FIG. 1, a number of application server systems 10 provide a platform for calendaring application server logic 12 and project management application server logic 14. The application server systems 10 may, for example, be made up of one or more server computer systems including processors, memory, and input/output devices, and the calendaring application server logic 12 and project management server logic 14 may be made up of computer program code stored in and executing on such server computer systems, hardware logic located within such server computer systems, and/or some combination of hardware logic and program code.

The calendaring application server logic 12 is shown communicably coupled to a number of team member client computer systems 16, and the project management application server logic 14 is shown communicably coupled to at least one project manager client system 18. For example, the calendaring application server logic 12 communicates with client application logic 30 in a team member client system 22 and with client application logic 24 in a team member client system 20. The client application logic 24 generates an electronic calendar user interface 26 for team member user B 28, while client application logic 30 generates an electronic calendar user interface 32 for a team member user A 34. The team member client system 20 and team member client system 22 may, for example, be made up of client computer systems, such as desktop, laptop, or other specific type of client computer system, and/or other specific types of electronic devices capable of providing graphical user interfaces including the electronic calendar user interfaces 26 and 32, such as personal data assistants (PDAs), cell phones, etc. The client application logic 26 and 32 may be made up of any specific type of client logic, such as program code executing on the team member client systems 20 and 22, hardware circuitry contained in the client systems 20 and 22, and/or some combination of such program code and hardware circuitry. For example, the client application logic 26 and 32 may include or be part of Web browser application programs or the like executing on the team member client systems 20 and 22.

Further in the example of FIG. 1, the project management application server logic 14 communicates with client application logic 36 in project manager client system 18. The client application logic 36 generates a project management user interface 38 for project manager user 40. The project manager client system 18 may, for example, be a client computer system, such as a desktop, laptop, or other type of client computer system, and/or other specific type of electronic device including a graphical user interface operable to present the generated project management user interface 38 to the project manager user 40, such as a personal data assistant (PDAs), cell phones, etc. The client application logic 36 may be made up of any specific type of client logic, such as program code executing on the project manager client system 18, hardware circuitry contained in the project manager client system 18, and/or some combination of such program code and hardware circuitry. For example, the client application logic 36 may include or be part of Web browser application programs or the like executing on the project manager client system 18.

During operation of the components shown in FIG. 1, a bi-directional feedback loop 42 is provided between the calendaring application server logic 12 and project management application server logic 14, as further described below.

Figure 2:
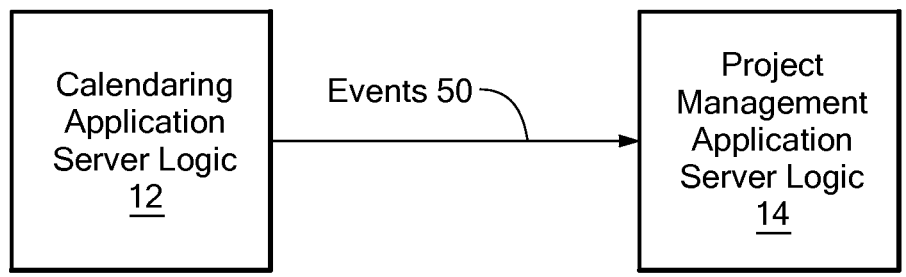
FIG. 2 illustrates operation of an embodiment of the disclosed system in which events are fired at a calendaring application server and detected by a project management application server.
Figure 3:
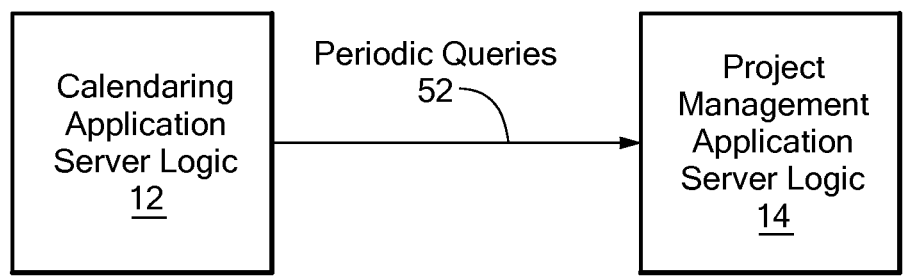
FIG. 3 illustrates operation of an embodiment of the disclosed system in which the project management server polls the calendaring server for team member calendar information.
Figure 4:
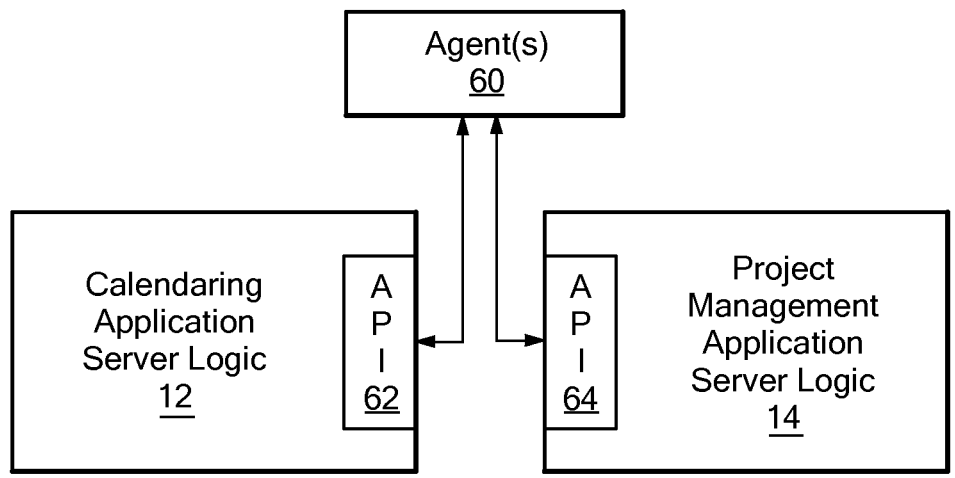
FIG. 4 illustrates operation of an embodiment of the disclosed system in which a number of software agents are provided to provide two-way communication between the calendaring application server and the project management application server.

The disclosed system may be embodied in various specific ways to provide the bi-directional feedback loop 42 of FIG. 1. FIGS. 2-4 illustrate three of many possible embodiments in this regard.

FIG. 2 illustrates operation of an embodiment of the disclosed system in which events 50 are fired by the calendaring application server logic 12, and are detected by the project management application server logic 14. For example, the events 50 may be triggered in the calendaring application server logic 12 in response to detection of a user scheduling more than a threshold amount of non-project related activities, such as vacations, training courses, etc. The events 50 may be triggered based on more detailed project task information provided from the project management application 14, such as the amount or percentage of time a given team member is expected to spend on a given project task during a specific time period. When the team member schedules a sufficient number of activities that would interfere with such project task requirements, the calendaring application server logic 12 would fire one of the events 50.

Upon detection of the events 50, the project management application server logic 14 causes a project manager, e.g. the project manager user 40 of FIG. 1, to be notified that a team member has scheduled an amount of activities in their electronic calendar that appears to conflict with their project task assignments. Such a notification may, for example, be provided through a user interface associated with the project management application, e.g. the project management user interface 38 shown in FIG. 1.

FIG. 3 illustrates operation of an embodiment of the disclosed system in which the project management application server logic 14 polls the calendaring server application logic 12 for team member calendar information through periodic queries 52. In the embodiment of FIG. 3, the project management application server logic 14 processes the received team member calendar information to determine whether a team member has scheduled an amount of non-project task related activities to create an apparent conflict with that team members project task commitments. If such a conflict is detected, the project management application server logic 14 causes a project manager to be notified that the team member has scheduled an amount of activities in their electronic calendar that appears to conflict with their project task assignments, e.g. through the project management user interface 38 shown in FIG. 1.

FIG. 4 illustrates operation of an embodiment of the disclosed system in which a number of software agents 60 are provided to provide two-way communication between the calendaring application server logic 12 and the project management application server logic 14. As shown in FIG. 4, one or more software agents 60 communicate with the calendaring application server logic 12 and the project management application server logic 14 through respective application programming interfaces 62 and 64. In the embodiment of FIG. 4, the logic for obtaining the calendaring information from the calendaring application sever logic 12, and for determining whether there are apparent conflicts with project task commitments of specific team members, may be provided in the agent(s) 60. Similarly, the logic for causing the appropriate project manager to be notified regarding the detection of such apparent conflicts may also be provided in the agent(s) 60.

Figure 5:
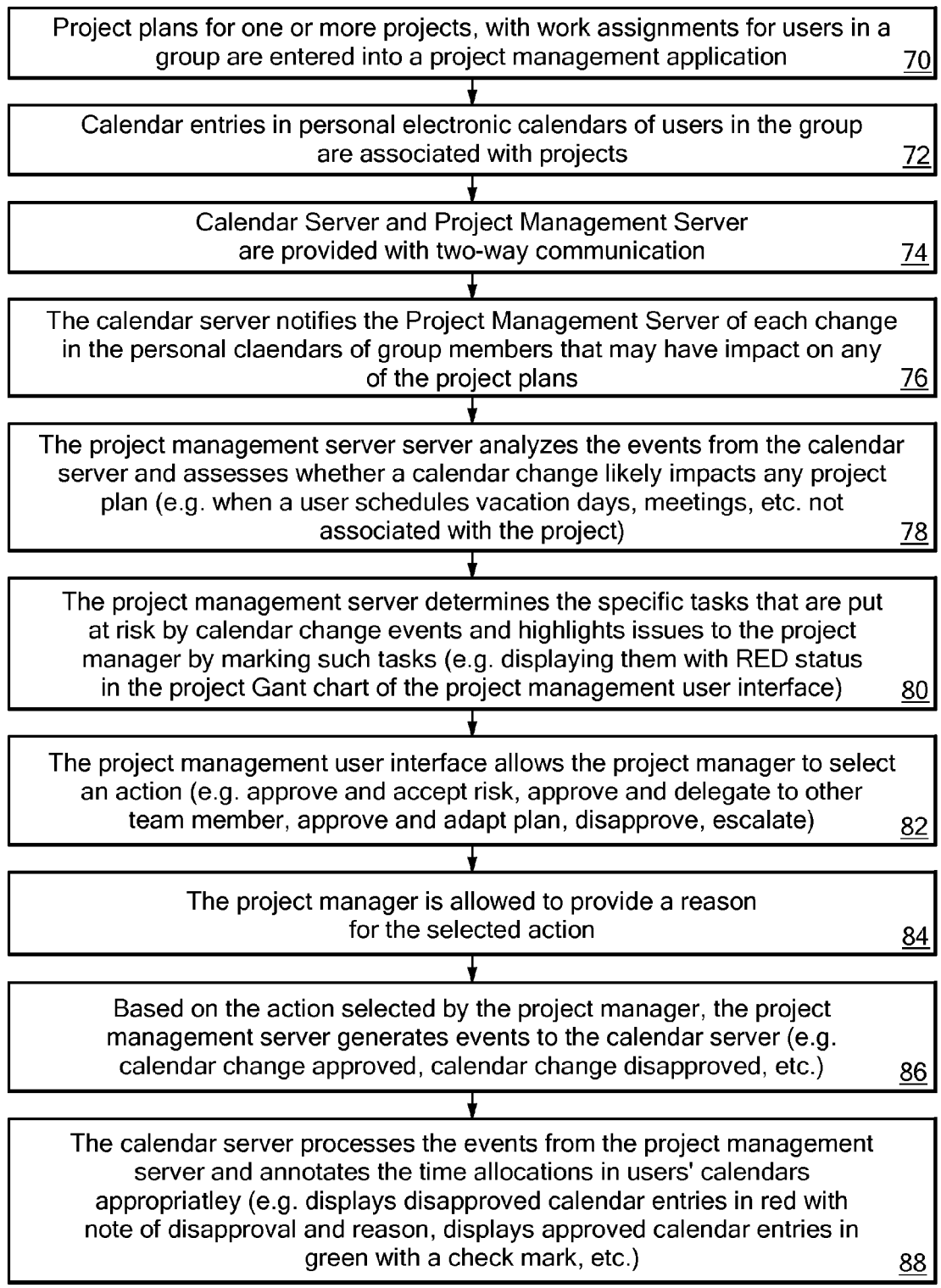
FIG. 5 is a flow chart of steps performed during operation of an illustrative embodiment of the disclosed system.

FIG. 5 is a flow chart of steps performed during operation of an illustrative embodiment of the disclosed system. As shown in FIG. 5, at step 70, project plans for the projects with work assignments for users in a group are entered into a project management application. For example, project plans may be stored by the project management application server logic 14 of FIG. 1. At step 72, calendar entries in personal electronic calendars of a group of users are associated with projects defined through a project management application. For example, calendar entries for calendar events such as meetings, telephone calls, vacations, and the like, may be entered by team member A 34 and team member B 28 through their respective electronic calendar user interfaces 32 and 26. These calendar entries are passed to the calendaring application server 12 and stored. The calendar entries defined by team member A 34 and team member B 28 may be associated with projects corresponding to the project plans entered at step 70 either manually by the respective team members through their respective electronic calendar user interfaces, or automatically in response to team member supplied subjects or topics associated with the entries. As some calendar entries may not be associated with any project, not all calendar entries correspond to one of the projects entered at step 70.

As noted above, the calendaring application server logic and project management application server logic are provided with two-way communication, which may be previously established, or may be established at step 74. Examples of how the disclosed system may provide such two-way communication are shown in FIGS. 2-4, but the disclosed system is not limited to those specific embodiments.

In one embodiment, at step 76, the calendar server notifies the project management server of each change in the personal calendars of group members that may have impact on any of the project plans entered at step 70. Such events may, for example, include the scheduling of vacation days, meetings or other work activities not associated with a project, etc. FIG. 2 illustrates how such events 50 may be passed from the calendaring application server logic 12 to the project management application logic 14.

At step 78, the project management server analyzes the events from the calendar server, and assesses whether a calendar change likely impacts any project plan. For example, events that might be provided from the calendar server indicating that a user has scheduled vacation days, and/or has scheduled meetings or other work activities not associated with a given project, might cause the project management server to determine whether the total amount of time scheduled for such activities is likely to have an impact on a project schedule, based on specific group member time allotments contained in one or more of the project plans entered at step 70.

The project management server determines at step 80 one or more specific tasks that are put at risk by received calendar change events, and highlights issues to the project manager by marking such tasks in a project management user interface (e.g. project management user interface 38). For example, the project management application server logic 14 may operate at step 80 to display one or more graphical representations of group member tasks in the project management user interface 38 in a predetermined color (e.g. red), where the tasks in the project management user interface 38 are each represented by graphical objects such as bars or lines arranged in a Gantt chart type configuration.

At step 82, the project management user interface allows the project manager to select an action to be taken with regard to the potential conflict detected at step 80. For example, a portion of the project management user interface 38 may display a number of user selectable options to the project manager user 40, where each of the displayed options is associated with an action regarding one or more calendar entries that have been determined to conflict with one or more tasks defined in the project plans entered at step 70. Such options may, for example, include approving of the conflicting calendar entry or entries (and accordingly accepting the risk that a task may be impacted), approving the conflicting calendar entry or entries and delegating the conflicting task to another group member user, approving the conflicting calendar entry or entries and adjusting the conflicting portion of the project plan, disapproving of the conflicting calendar entry or entries, and/or causing an escalation of the conflict to a higher level of management (e.g. by causing an e-mail message or the like to be sent to a higher level manager user).

In one embodiment, at step 84 the project manager user is allowed to provide a reason (e.g. text) explaining why a specific action was selected in step 84. At step 86, based in the action selected by the project manager at step 82, the project management server communicates with the calendar server (e.g. generates one or more events that are propagated to the calendar server). For example, such events might be events indicating the approval or disapproval of specific calendar entries, and include any associated reason information entered by the project manager.

Upon receipt of the action information provided at step 86 from the project management server, at step 88 the calendar server processes the specific actions indicated by that action information, and annotates the affected dates and/or times as displayed in the specific electronic calendar user interfaces of the affected team members. For example, such annotations may include visual indications of disapproved calendar entries, such as marking of disapproved calendar entries in a first pre-determined color and/or visual display format (e.g. in red with a reason for the disapproval also displayed), displaying approved calendar entries in a second pre-determined color and/or visual display format (e.g. in green with a check mark displayed proximate to the entry), etc. Any specific type of distinct colors or other visual indications may be used to indicate the specific actions taken by the project manager in response to detection of a schedule conflict. Moreover, display of and/or access to reason information in the electronic calendar user interfaces may be provided for any of actions that may be taken by the project manager in response to detection of a potential project schedule conflict detected by the disclosed system.

Figure 6:
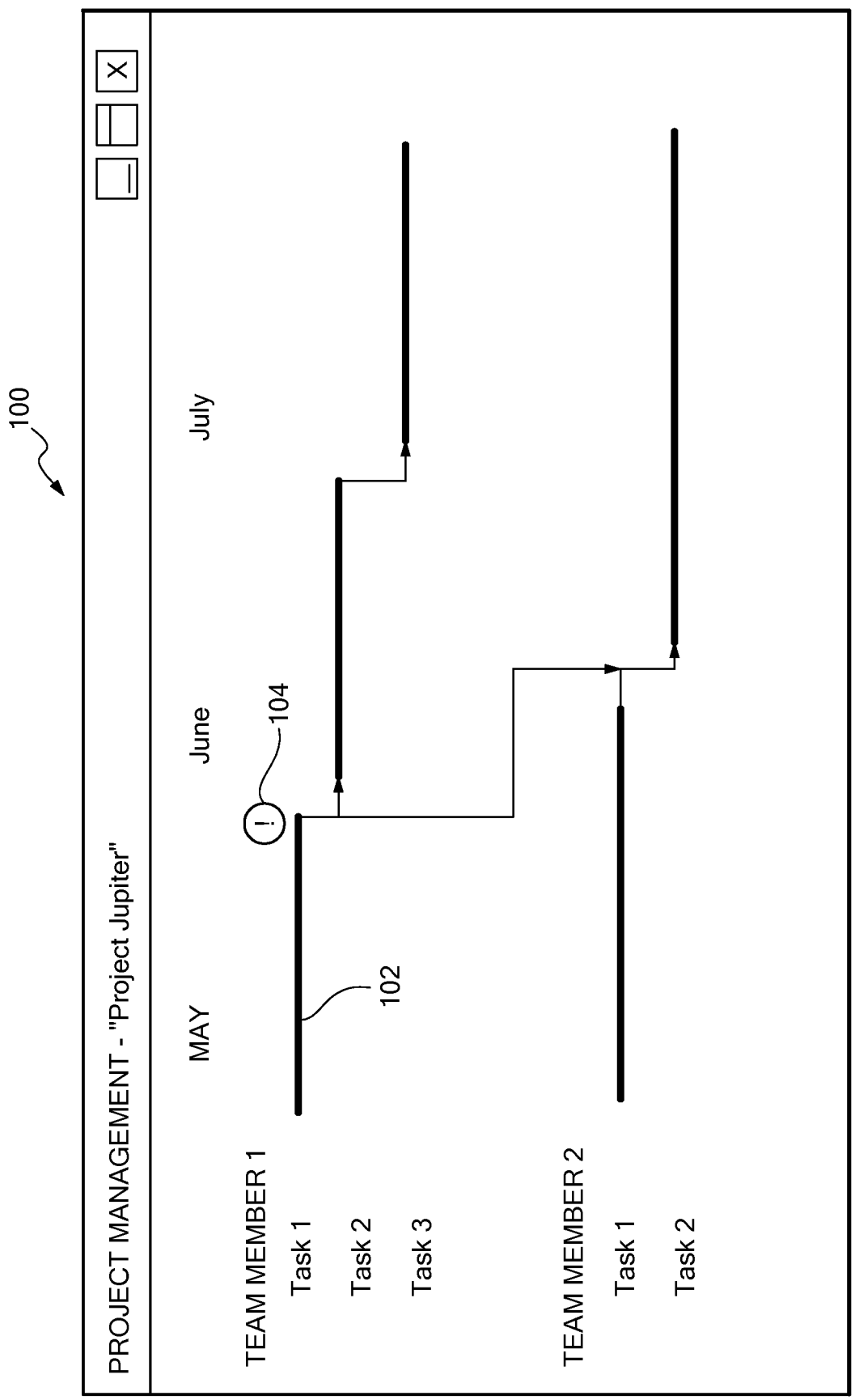
FIG. 6 is a simplified screen shot showing an example of a project management user interface provided to a project manager user in an illustrative embodiment of the disclosed system.

FIG. 6 is a simplified screen shot showing an example of a project management user interface 100 provided to a project manager user in an illustrative embodiment of the disclosed system. As shown in FIG. 6, the project management user interface 100 includes a Gantt chart like display of the tasks assigned to team member 1 and team member 2 across the time period consisting of May, June and July, and further visually illustrating inter-task dependencies. In the example of FIG. 6, the disclosed system has detected a potential conflict between the electronic calendar entries of team member 1 and the time required during May to complete task 1 of Project Jupiter. In order to visually indicate this detected potential conflict (i.e. generate an alert to the project manager), the graphical line or bar 102 may be displayed in a predetermined color (e.g. red), and a graphic icon, such as the exclamation point in a circle 104, may be displayed adjacent to the graphical line or bar 102. In order to access more information regarding the conflict, such as detail information regarding the conflicting electronic calendar entries (e.g. the specific type(s), time(s) and date(s) of the conflicting calendar entries), as well as to access the selectable options that may be taken with regard to the detected potential conflict, the project manager user may be allowed to click through or hover over the icon 104, and/or one or more other specific user interface mechanisms (e.g. menus, buttons, etc.) may be provided for these purposes within the project management user interface 38.

Figure 7:
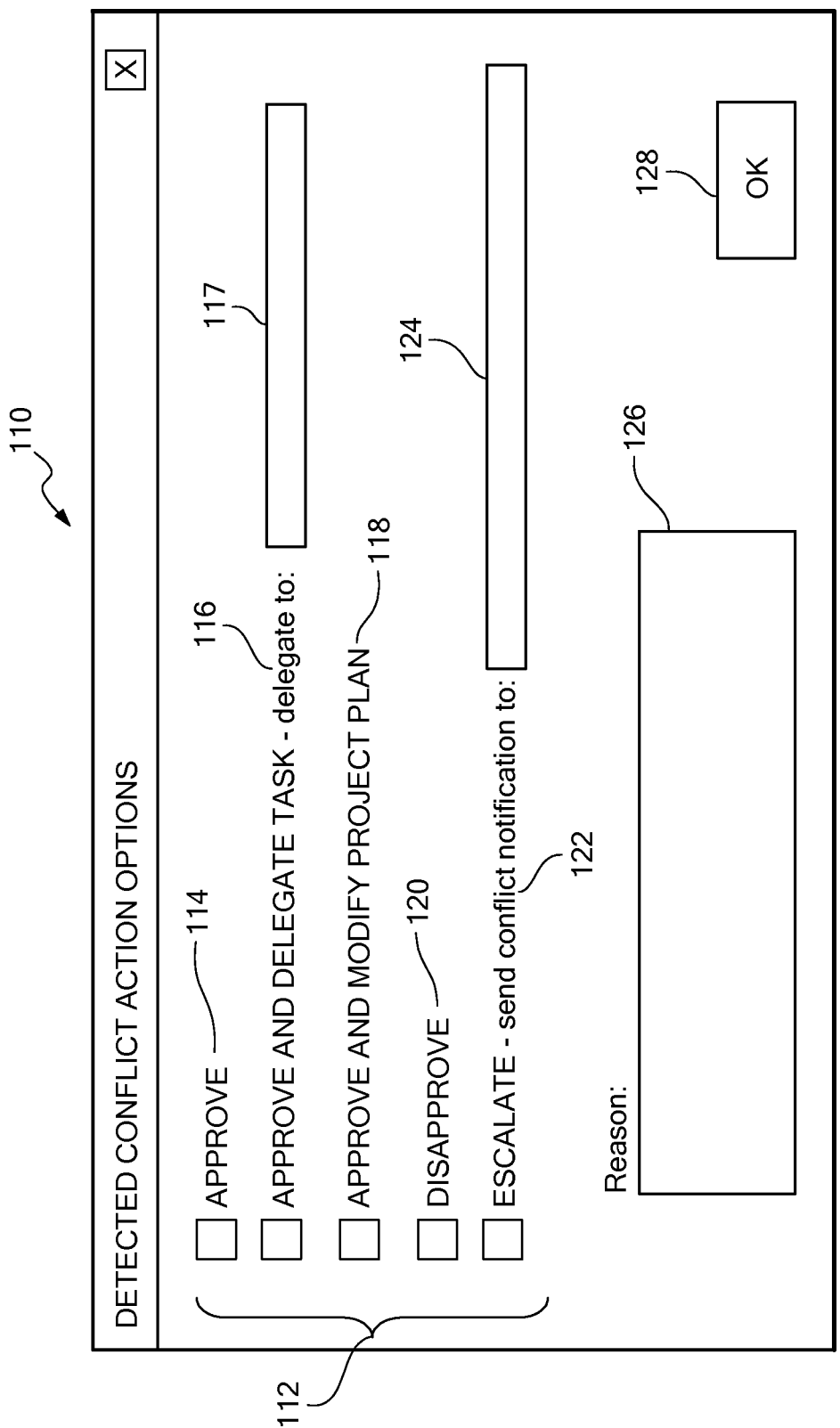
FIG. 7 is a simplified screen shot showing an example of a detected conflict action option selection user interface provided to a project manager in an illustrative embodiment of the disclosed system.

FIG. 7 is a simplified screen shot showing an example of a detected conflict action option selection user interface 110 provided to a project manager in an illustrative embodiment of the disclosed system. The option selection user interface 110 of FIG. 7 is shown including check boxes for a number of selectable options 112 that may be taken with regard to a potential conflict between team member electronic calendar information and the time allotments for team members with regard to one or more project plans. The selectable options of FIG. 7 are shown including an approve option 114, an approve and delegate option 116, an approve and modify project plan option 118, a disapprove option 120, and an escalate option 122. A delegate to: field 117 is provided for the project manager user to enter a user name, e-mail address, etc., that indicates another team member to which the conflicting task is to be re-assigned to in the event that the approve and delegate task option 116 is selected. In one embodiment, the disclosed system will notify the team member to whom the task is delegated, for example by generating a meeting invitation to that team member (e.g. through an e-mail message). A send conflict notification to: field 124 is provided for the project manager user to enter a user name, e-mail address, etc., that indicates a higher level manager to which a notification message regarding the detected conflict is to be sent in the event that the escalate option 122 is selected. A reason: field 126 is provided for the project manager user to enter a reason for which one of the options 112 was selected. An OK button 128 is provided for the project manager user to indicate that they have finished selecting the desired one of the options 112, entered any necessary information in the delegate to: and send conflict notification to: fields 117 and 124, and/or provided any desired reason information within the reason: field 126.

Figure 8:
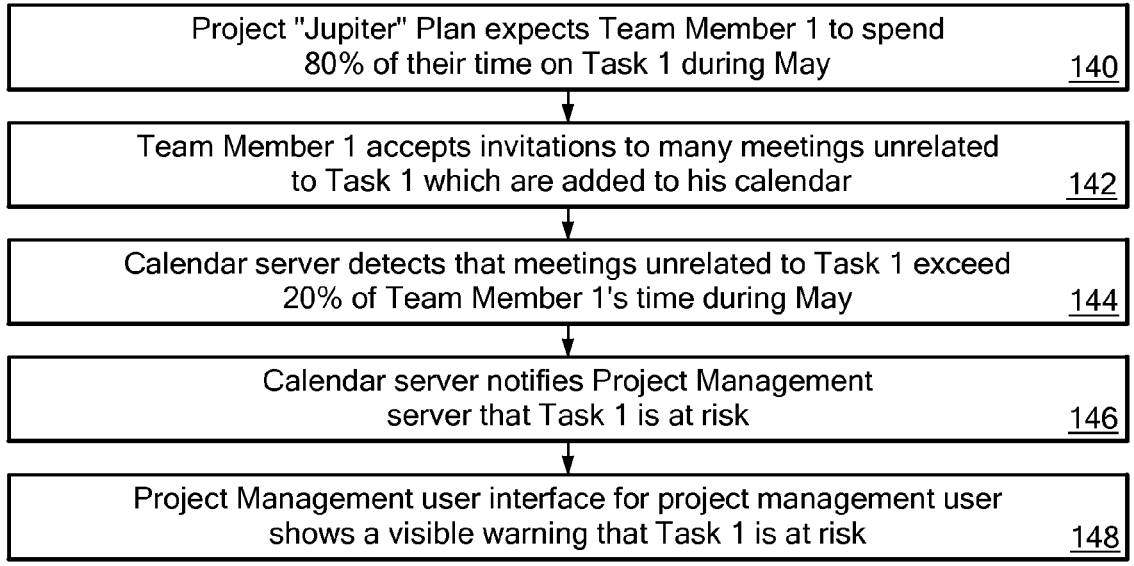
FIG. 8 is a flow chart showing steps performed during a use case example of operation of a first illustrative embodiment of the disclosed system.

FIG. 8 is a flow chart showing steps performed during a use case example of operation of a first illustrative embodiment of the disclosed system. As shown in FIG. 8, at step 140, a project plan for the "Jupiter" project is defined that includes time requirements for team member 1 to spend 80% of their time on task 1 during the month of May. At step 142, team member 1 accepts invitations to some number of meetings during May that are unrelated to task 1, and these meetings are added to team member 1's electronic calendar. In the example of FIG. 8, at step 144 the calendar server detects that the meeting unrelated to task 1 during May exceed 20% of team member 1's time in May. Accordingly, at step 146, the calendar server notifies the project management server at step 146 that task 1 may be at risk (i.e. there is a potential conflict between team member 1's calendar entries and the project plan including task 1). At step 148 the project management user interface provided to a project manager user provides an alert in the form of a visual warning to the project manager user that task 1 is at risk (i.e. a potential schedule conflict has been detected regarding task 1).

Figure 9:
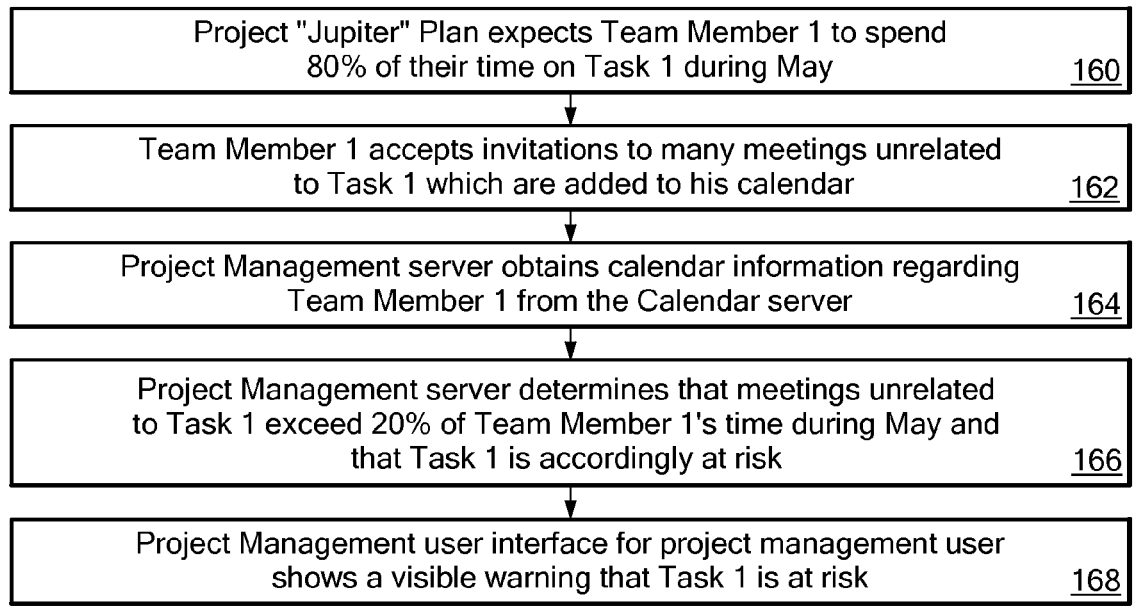
FIG. 9 is a flow chart showing steps performed during a use case example of operation of a second illustrative embodiment of the disclosed system.

FIG. 9 is a flow chart showing steps performed during a use case example of operation of a second illustrative embodiment of the disclosed system. As shown in FIG. 9, at step 160, a project plan for project "Jupiter" is defined having time commitments for team member 1 that include spending 80% of their time on task 1 during May. At step 162, team member 1 accepts invitations to some number of meetings unrelated to task 1, and these meetings are added to team member 1's electronic calendar. At step 164, the project management server obtains calendar event information regarding team member 1 from the calendar server. Then at step 166, the project management server determines that the accepted meetings unrelated to task 1 exceed 20% of team member 1's time during May, and that task 1 is accordingly at risk of slipping. At step 168 the project management user interface displays an "alert" that is a visual warning to the project manager user that the schedule for task 1 is at risk.

While the above description regarding illustrative embodiments of the disclosed system includes examples of specific user interface display objects, such as graphical buttons, menus, dialog boxes, and the like, the present invention is not limited to those specific examples. Accordingly, those skilled in the art will recognize that alternative embodiments may use any specific type or kind of user interface display object that may be appropriate.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for providing a bi-directional feedback loop between a project management client-server application and a separate personal electronic calendar client-server application, comprising:
   wherein said project management client-server application includes i) project management application server logic executing on one or more application server systems, and ii) project management client application logic executing on a project manager client system;
   wherein said personal electronic calendar client-server application includes i) calendaring application server logic executing on said application server systems, and ii) calendaring application client logic executing on a team member client system;
   wherein said application server systems, said project manager client system, and said team member client system each include at least one processor and a memory;
   communicating, from said calendaring application server logic to said project management application server logic, personal schedule information for a team member;
   determining, by said project management application server logic, that said personal schedule information for said team member user conflicts with delivery by said team member user of a deliverable associated with a project task, wherein said determining that said personal schedule information for said team member user conflicts with delivery of said project task includes determining that a meeting defined within said personal schedule information for said team member user conflicts with delivery of said deliverable associated with said project task;
   providing, by said project management client application logic, within a project management user interface contained in a graphical user interface of said project manager client system, a perceptible alert to a project manager user of said conflict;
   providing, by said project management client application logic, within said project management user interface contained in said graphical user interface of said project manager client system, user interface options to said project manager enabling said project management user to select from a set of options to handle said conflict; and
   responsive to said project manager user selecting one of said set of options, said project management application server logic performing an action corresponding to said selected one of said set of options to handle said conflict, the action causing said calendaring application client logic to alter a graphical user interface of said team member client system, thereby providing a bi-directional feedback loop between the project management client-server application and the separate personal electronic calendar client-server application.

2. The method of claim 1, further comprising:
   wherein said set of options includes a forbid option enabling said project manager user to forbid said team member user from participating in said meeting defined within said personal schedule information; and
   modifying, in the event that said project manager user selects said forbid option, said personal schedule information to remove said meeting from said personal schedule information.

3. The method of claim 2, further comprising:
   responsive to said project manager user selecting said forbid option, providing, by said calendaring application client logic, within an electronic calendar user interface contained in said graphical user interface of said team member client system, a visual indication to said team member user that said project manager user has forbidden said team member user from participating in said meeting.

4. The method of claim 3, further comprising:
   enabling, by said project management client application logic, said project manager user to enter a reason associated with said selection of said forbid option into said project management user interface contained in said graphical user interface of said project manager client system; and
   including, by said calendaring application client logic, said reason in said visual indication to said team member user.

5. The method of claim 4, further comprising:
   wherein said set of options includes a permit option enabling said project manager user to permit said team member user to participate in said meeting defined within said personal schedule information; and
   modifying, by said project management application server logic, in the event that said project manager user selects said permit option, said personal schedule information to include an indication that said project manager was alerted of said conflict and permitted said team member user to participate in said meeting defined within said personal schedule information.

6. The method of claim 5, further comprising:
responsive to said project manager user selecting said permit option, providing, by said calendaring application client logic, within said electronic calendar user interface contained in said graphical user interface of said team member client system, a visual indication to said team member user that said project manager user has permitted said team member user to participate in said meeting.

7. The method of claim 6, further comprising:
enabling, by said project management client application logic, said project manager user to enter a reason associated with said selection of said permit option into said project management user interface contained in said graphical user interface of said project manager client system; and
including, by said calendaring application client logic, said reason in said visual indication to said team member user.

8. The method of claim 7, further comprising:
wherein said set of options includes an escalate option enabling said project manager user to automatically notify a higher level manager user regarding said conflict; and
modifying, by said project management application server logic, in the event that said project manager user selects said escalate option, said personal schedule information to include an indication that said project manager user was alerted of said conflict and has escalated said conflict by notifying said higher level manager user.

9. The method of claim 8, further comprising:
responsive to said project manager user selecting said escalate option, providing, by said calendaring application client logic, within said electronic calendar user interface contained in said graphical user interface of said team member client system, a visual indication to said team member user that said project manager user has escalated said conflict by notifying said higher level manager user.

10. The method of claim 9, further comprising:
enabling, by said project management client application logic, said project manager user to enter a reason associated with said selection of said escalate option into said project management user interface contained in said graphical user interface of said project manager client system; and
including, by said calendaring application client logic, said reason in said visual indication to said team member user.

11. The method of claim 10, further comprising:
wherein said set of options includes a permit and reassign option enabling said project manager user to permit said team member user to participate in said meeting defined within said personal schedule information and also reassign at least one deliverable previously assigned to said team member user; and
modifying, in the event that said project manager user selects said permit and reassign option, said personal schedule information to include an indication that said project manager user was alerted of said conflict and permitted said team member user to participate in said meeting defined within said personal schedule information and further reassigned said at least one deliverable previously assigned to said team member user.

12. The method of claim 11, further comprising:
responsive to said project manager user selecting said permit and reassign option, providing, by said calendaring application client logic, within said electronic calendar user interface contained in said graphical user interface of said team member client system, a visual indication to said team member user that said project manager has permitted said team member user to participate in said meeting and further reassigned said at least one deliverable previously assigned to said team member user.

13. The method of claim 12, further comprising:
responsive to said project manager user selecting said permit and reassign option, providing a notification message to another team member user to which said deliverable has been reassigned by said project manager user.

14. The method of claim 13, further comprising:
enabling, by said project management client application logic, said project manager user to enter a reason associated with said selection of said permit and reassign option into said project management user interface contained in said graphical user interface of said project manager client system; and
including, by said calendaring application client logic, said reason in said visual indication to said team member user.

15. The method of claim 1, wherein said determining that said personal schedule information for said team member user conflicts with delivery by said team member user of a deliverable associated with a project task comprises:
determining a necessary amount of time during a time period required for said team member user to complete said deliverable; and
determining that participating in said meeting causes said team member user to have less than said necessary amount of time during said time period available for completing said deliverable.

16. A system for providing a bi-directional feedback loop between a project management client-server application and a separate personal electronic calendar client-server application, comprising:
one or more application server systems, a project manager client system, and a team member client system, wherein said application server systems, said project manager client system, and said team member client system each include at least one processor and a memory;
a project management client-server application including i) project management application server logic stored in, and for execution on said application server systems, and ii) project management client application logic stored in, and for execution on said project manager client system;
a personal electronic calendar client-server application including i) calendaring application server logic stored in, and for execution on said application server systems, and ii) calendaring application client logic stored in, and for execution on said team member client system;
program code, within said calendaring application server logic, for communicating personal schedule information for a team member to said project management application server logic;
program code, within said project management application server logic, for determining that said personal schedule information for said team member user conflicts with delivery by said team member user of a deliverable associated with a project task, wherein said determining that said personal schedule information for said team member user conflicts with delivery of said project task includes determining that a meeting defined within said personal schedule information for said team member user conflicts with delivery of said deliverable associated with said project task;

program code, within said project management client application logic, for providing, within a project management user interface contained in a graphical user interface of said project manager client system, a perceptible alert to a project manager user of said conflict;

program code, within said project management client application logic, for providing, within said project management user interface contained in said graphical user interface of said project manager client system, user interface options to said project manager enabling said project management user to select from a set of options to handle said conflict; and program code, within said project management application server logic, for, responsive to said project manager user selecting one of said set of options, performing an action corresponding to said selected one of said set of options to handle said conflict, the action causing said calendaring application client logic to alter a graphical user interface of said team member client system, thereby providing a bi-directional feedback loop between the project management client-server application and the separate personal electronic calendar client-server application.

17. A computer program product including a non-transitory computer readable medium, said computer readable medium having program code stored thereon for providing a bi-directional feedback loop between a project management client-server application and a separate personal electronic calendar client-server application, wherein said project management client-server application includes i) project management application server logic for execution on one or more application server systems, and ii) project management client application logic for execution on a project manager client system, wherein said personal electronic calendar client-server application includes i) calendaring application server logic for execution on said application server systems, and ii) calendaring application client logic for execution on a team member client system, said program code comprising:

program code, within said calendaring application server logic, for communicating personal schedule information for a team member to said project management application server logic;

program code, within said project management application server logic, for determining that said personal schedule information for said team member user conflicts with delivery by said team member user of a deliverable associated with a project task, wherein said determining that said personal schedule information for said team member user conflicts with delivery of said project task includes determining that a meeting defined within said personal schedule information for said team member user conflicts with delivery of said deliverable associated with said project task;

program code, within said project management client application logic, for providing, within a project management user interface contained in a graphical user interface of said project manager client system, a perceptible alert to a project manager user of said conflict;

program code, within said project management client application logic, for providing, within said project management user interface contained in said graphical user interface of said project manager client system, user interface options to said project manager enabling said project management user to select from a set of options to handle said conflict; and program code, within said project management application server logic, for, responsive to said project manager user selecting one of said set of options, performing an action corresponding to said selected one of said set of options to handle said conflict, the action causing said calendaring application client logic to alter a graphical user interface of said team member client system, thereby providing a bi-directional feedback loop between the project management client-server application and the separate personal electronic calendar client-server application.

18. The method of claim 1, wherein said communicating personal schedule information for a team member further comprises said project management application server logic periodically polling said calendaring application server logic for said personal schedule information for said team member.

* * * * *